United States Patent
Nasman et al.

(10) Patent No.: US 11,125,333 B2
(45) Date of Patent: Sep. 21, 2021

(54) TRANSLATING FLUID COUPLING DEVICE

(71) Applicant: United Technologies Corporation, Farmington, CT (US)

(72) Inventors: Benjamin Nasman, Tolland, CT (US); Michael M. Davis, North Granby, CT (US)

(73) Assignee: Raytheon Technologies Corporation, Farmington, CT (US)

( * ) Notice: Subject to any disclaimer, the term of this patent is extended or adjusted under 35 U.S.C. 154(b) by 116 days.

(21) Appl. No.: 16/434,532

(22) Filed: Jun. 7, 2019

(65) Prior Publication Data
US 2020/0386318 A1 Dec. 10, 2020

(51) Int. Cl.
*F16J 15/34* (2006.01)
*F01D 11/00* (2006.01)

(52) U.S. Cl.
CPC ......... *F16J 15/3404* (2013.01); *F01D 11/003* (2013.01); *F16J 15/3464* (2013.01)

(58) Field of Classification Search
CPC ........ F16J 15/3404; F16J 15/34; F16J 15/342; F16J 15/3464; F16J 15/30; F01D 11/003; F01D 11/00; F01D 11/001
USPC ....................................................... 277/579
See application file for complete search history.

(56) References Cited

U.S. PATENT DOCUMENTS

| | | | |
|---|---|---|---|
| 1,876,515 A | 9/1932 | Emmet | |
| 2,857,182 A * | 10/1958 | Bain | F16J 15/38 277/401 |
| 2,990,202 A | 6/1961 | Dennison | |
| 3,025,115 A | 3/1962 | Shevchenko | |
| 3,033,579 A * | 5/1962 | Seaver | F01D 11/003 277/387 |
| 3,964,753 A | 6/1976 | Junker et al. | |
| 4,406,459 A * | 9/1983 | Davis | F16J 15/3404 277/401 |
| 4,749,199 A | 6/1988 | Gresh | |
| 5,544,896 A * | 8/1996 | Draskovich | F16J 15/3404 277/404 |
| 5,658,127 A * | 8/1997 | Bond | F01D 25/183 277/399 |
| 8,845,282 B2 | 9/2014 | LaPierre et al. | |
| 8,920,034 B2 | 12/2014 | Galivel | |
| 2018/0291960 A1 | 10/2018 | Anglin | |
| 2019/0040957 A1 | 2/2019 | Miller | |

OTHER PUBLICATIONS

EP search report for EP20178614.2 dated Nov. 9, 2020.

* cited by examiner

*Primary Examiner* — Nathan Cumar
(74) *Attorney, Agent, or Firm* — Getz Balich LLC (57) ABSTRACT

An assembly is provided for a gas turbine engine. This gas turbine engine assembly includes a pin, a seal support assembly and a seal element. The pin is configured with a pin fluid passage. The seal support assembly is mated with and slidable along the pin. The seal element is mounted to the seal support assembly. The seal element is configured with a seal element fluid passage that is fluidly coupled with the pin fluid passage through the seal support assembly.

19 Claims, 8 Drawing Sheets

TRANSLATING FLUID COUPLING DEVICE

BACKGROUND OF THE DISCLOSURE

1. Technical Field

This disclosure relates generally to a gas turbine engine and, more particularly, to fluid delivery to and/or cooling of a gas turbine engine component.

2. Background Information

A typical gas turbine engine includes seal assemblies to seal gaps between stationary and rotating components. One such known seal assembly includes a stationary carbon seal element that contacts a rotating seal land. Rubbing friction between the stationary carbon seal element and the rotating seal land subjects both the stationary carbon seal element and the rotating seal land to relatively high temperatures and, thus, thermal stresses and fatigue. Various techniques are known in the art for cooling such a seal assembly. While these known cooling techniques have various advantages, there is still room in the art for improvement.

SUMMARY OF THE DISCLOSURE

According to an aspect of the present disclosure, an assembly is provided for a gas turbine engine. This assembly includes a pin, a seal support assembly and a seal element. The pin is configured with a pin fluid passage. The seal support assembly is mated with and slidable along the pin. The seal element is mounted to the seal support assembly. The seal element is configured with a seal element fluid passage that is fluidly coupled with the pin fluid passage through the seal support assembly.

According to another aspect of the present disclosure, another assembly is provided for a gas turbine engine. This assembly includes a guide rail, a seal carrier, a seal element and a fluid coupling. The guide rail is configured with a rail fluid passage. The seal carrier is mated with and axially slidable along the guide rail. The seal carrier is configured with a carrier fluid passage. The seal element is mounted to the seal carrier. The seal element is configured with a seal element fluid passage adapted to receive fluid from the carrier fluid passage. The fluid coupling device is mounted to and axially slidable along the guide rail. The fluid coupling device is configured with a device fluid passage adapted to direct the fluid from the rail fluid passage to the carrier fluid passage.

According to still another aspect of the present disclosure, another assembly is provided for a gas turbine engine. This assembly includes a guide rail, a translating device and a fluid coupling device. The guide rail is configured with a rail fluid passage. The translating device is mated with and axially translatable along the guide rail. The translating device is configured with a translating device fluid passage. The fluid coupling device is mounted to and axially slidable along the guide rail. The fluid coupling device is configured with a coupling device fluid passage adapted to direct fluid from the rail fluid passage to the translating device fluid passage. The fluid coupling is adapted to move radially relative to the translating device.

The guide rail may be configured as or otherwise include a guide pin.

The assembly may include a seal element mounted to the translating device. The translating device may be configured as a seal carrier.

The seal element may be configured with a seal element fluid passage adapted to receive the fluid from the translating device fluid passage.

The assembly may include a seal land sealingly engaged with the seal element.

The assembly may include a spring element engaged with the seal support assembly and configured to bias the seal element against the seal land.

The seal element may be configured as or otherwise include an annular carbon seal element.

The seal element may extend circumferentially around a centerline. An inlet portion of the seal element fluid passage may extend axially along the centerline into the seal element. An outlet portion of the seal element fluid passage may extend radially, relative to the centerline, into the seal element.

The assembly may include a plurality of pins that include the pin. The plurality of pins may be arranged in an array about a centerline of the gas turbine engine. The seal support may be mated with and slidable along each of the plurality of pins. The seal element may extend circumferentially around the centerline.

The seal support assembly may include a seal carrier and a fluid coupling device. The seal carrier may be mated with and slidable along the pin. The seal carrier may be configured with a carrier fluid passage that is fluidly coupled with the seal element fluid passage. The fluid coupling device may be mounted to and slidable along the pin. The fluid coupling device may be configured with a device fluid passage that fluidly couples the pin fluid passage with the carrier fluid passage.

The fluid coupling device may be configured to move relative to the seal carrier.

The fluid coupling device may include a sleeve and a tube. The sleeve may be mounted to and slidable along the pin. The tube may project out from the sleeve and into a receptacle of the seal carrier.

The device passage may include a device slot and a device aperture. The device slot may be formed in the sleeve and abut the pin. The device aperture may project out from the device slot and extend through the sleeve and the tube.

The pin fluid passage may include a pin bore and a pin aperture that projects out from the pin bore and extends through a sidewall of the pin. An outlet of the pin aperture may interface with the device slot.

The assembly may include a ring seal arranged between the tube and the seal carrier.

The carrier fluid passage may include an annular slot that interfaces with an inlet of the seal element fluid passage.

The seal carrier may include a flange. The pin may project through a channel that extends radially into the flange.

The assembly may include a static structure of the gas turbine engine. The pin may be mounted to the static structure.

The foregoing features and the operation of the invention will become more apparent in light of the following description and the accompanying drawings.

DETAILED DESCRIPTION

Figure 1:
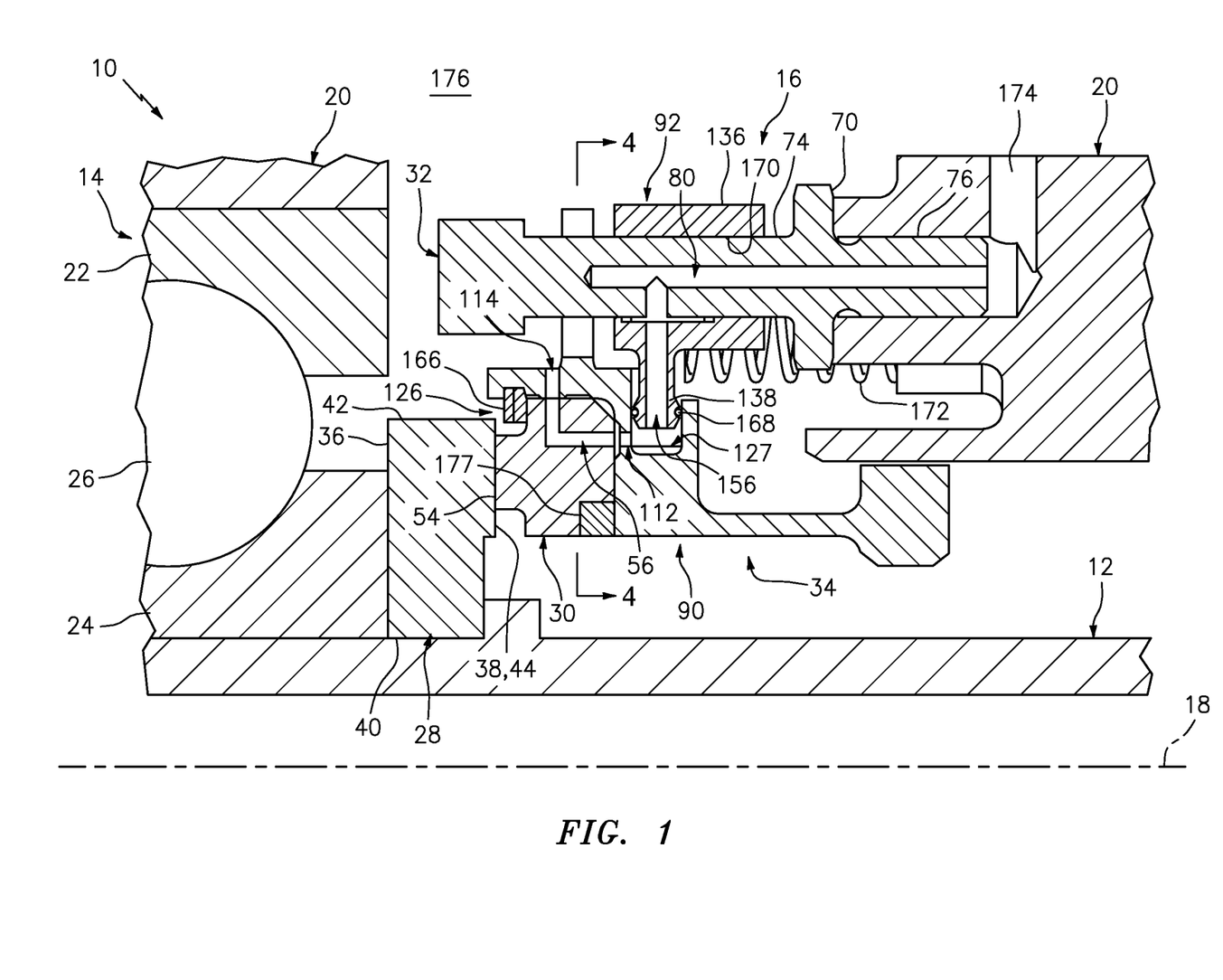
FIG. 1 is a partial side sectional illustration of an assembly for a gas turbine engine.

FIG. 1 is a partial side sectional illustration of an assembly 10 for a gas turbine engine. This engine assembly 10 includes a rotating element 12, a bearing 14 and a seal assembly 16.

The rotating element 12 is rotatable about an axial centerline 18, which centerline 18 may be an axial centerline of the gas turbine engine. The rotating element 12 of FIG. 1 is configured as a tubular engine shaft. However, in other embodiments, the rotating element 12 may be configured as another component (e.g., a sleeve) mounted to and rotatable with an engine shaft, or any other rotor within the gas turbine engine.

The bearing 14 is configured to rotatably support the rotating element 12 relative to a static structure 20; e.g., an engine case, a strut assembly, etc. The bearing 14 may be configured as a roller element bearing. The bearing 14 of FIG. 1, for example, includes an annular outer race 22, an annular inner race 24 and a plurality of bearing elements 26; e.g., cylindrical or spherical elements. The outer race 22 circumscribes the inner race 24 and the bearing elements 26. The outer race 22 is mounted to the static structure 20. The inner race 24 circumscribes and is mounted to the rotating element 12. The bearing elements 26 are arranged in an annular array about the axial centerline 18, which array is radially between and engaged with the outer race 22 and the inner race 24. The present disclosure, of course, is not limited to the foregoing exemplary bearing configuration. For example, in other embodiments, the bearing may be configured as a journal bearing or any other type of bearing utilized in the gas turbine engine.

The seal assembly 16 is configured to seal an annular gap between a rotating assembly and the static structure 20, which rotating assembly includes at least the rotating element 12. The seal assembly 16 of FIG. 1, for example, is configured to seal the gap which extends (e.g., radially and/or axially) between the static structure 20 and the rotating element 12. Of course, in other embodiments, the seal assembly 16 may seal a gap extending between the static structure 20 and another rotating component mounted to and/or rotatable with the rotating element 12.

The seal assembly 16 of FIG. 1 includes an annular seal land 28 and an annular seal element 30; e.g., a carbon seal element. The seal assembly 16 of FIG. 1 also includes one or more guide rails 32 and a seal support assembly 34.

The seal land 28 is configured with a full hoop body that extends circumferentially about the axial centerline 18. The seal land 28 extends axially along the axial centerline 18 between an axial first end 36 and an axial second end 38. The seal land 28 extends radially between a radial inner side 40 and a radial outer side 42.

The seal land 28 includes an annular, radially extending seal land surface 44 located at (e.g., on, adjacent or proximate) the axial second end 38. This seal land surface 44 may be an uninterrupted surface. The seal land surface 44, for example, may be a flat planar surface configured without circumferential and/or radial interruptions such as, but not limited to, channels, slots and apertures. Of course, in other embodiments, the seal land surface 44 may be circumferentially and/or radially interrupted by one or more channels, slots, apertures and/or other types of surface interruptions.

Figure 2:
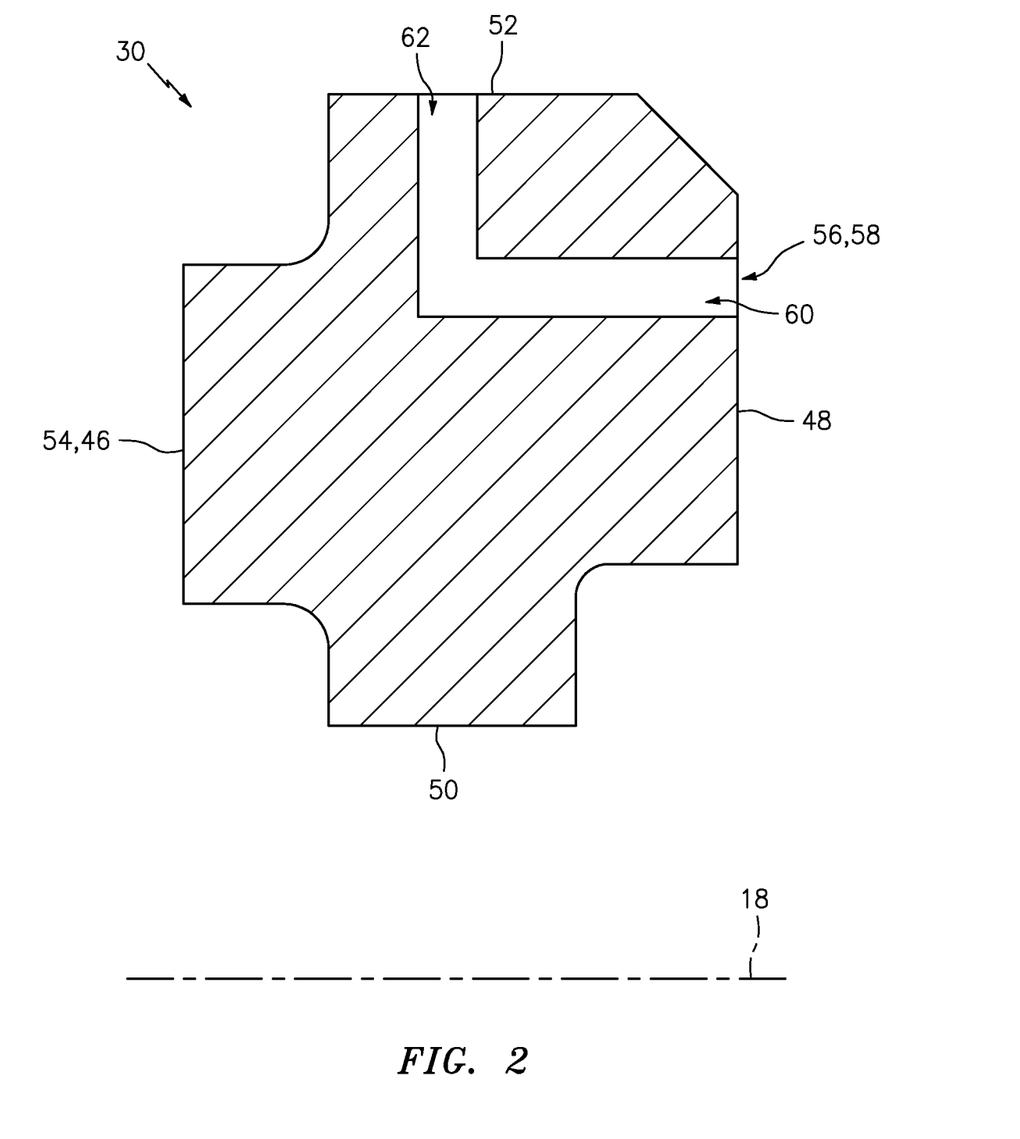
FIG. 2 is a partial side sectional illustration of a seal element.

Referring to FIG. 2, the annular seal element 30 is configured with a full hoop body that extends circumferentially about the axial centerline 18. This full hoop body may be a single unitary body; e.g., a monolithic body. Alternatively, the full hoop body may be a segmented body; e.g., the seal element 30 may be configured from an array of arcuate seal element segments. The seal element 30 extends axially along the axial centerline 18 between an axial first end 46 and an axial second end 48. The seal element 30 extends radially between a radial inner side 50 and a radial outer side 52.

The seal element 30 includes an annular, radially extending seal element surface 54 located at (e.g., on, adjacent or proximate) the axial first end 46. This seal element surface 54 may be an uninterrupted surface. The seal element surface 54, for example, may be a flat planar surface configured without circumferential and/or radial interruptions such as, but not limited to, channels, slots and apertures. Of course, in other embodiments, the seal element surface 54 may be circumferentially and/or radially interrupted by one or more channels, slots, apertures and/or other types of surface interruptions.

Figure 3:
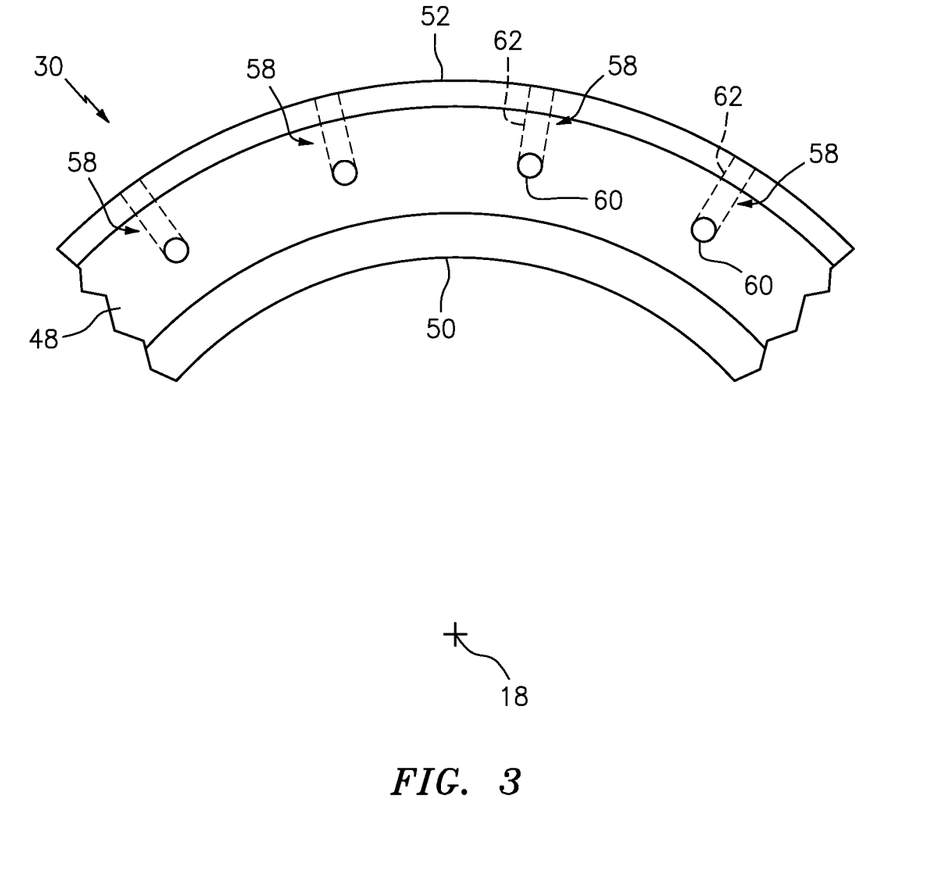
FIG. 3 is a partial end view illustration of the seal element.

The seal element 30 is configured with an internal seal element fluid passage 56. This fluid passage 56 includes/is formed by one or more passageways 58 through the seal element 30; see also FIG. 3. These passageways 58 may be located circumferentially about the axial centerline 18 in an annular array as shown in FIG. 3. Referring again to FIG. 2, each passageway 58 includes/is formed by an inlet portion 60 and an outlet portion 62 connected to the inlet portion 60 at a corner; e.g., an elbow. The inlet portion 60 is an aperture (e.g., a hole, groove, or some other form of passageway) that may extend axially along the axial centerline 18 partially into the seal element 30 from the axial second end 48 to the outlet portion 62. The outlet portion 62 is an aperture (e.g., a hole, groove, or some other form of passageway) that may extend radially, relative to the axial centerline 18, partially into the seal element 30 from the radial outer side 52 to the inlet portion 60.

Figure 4:
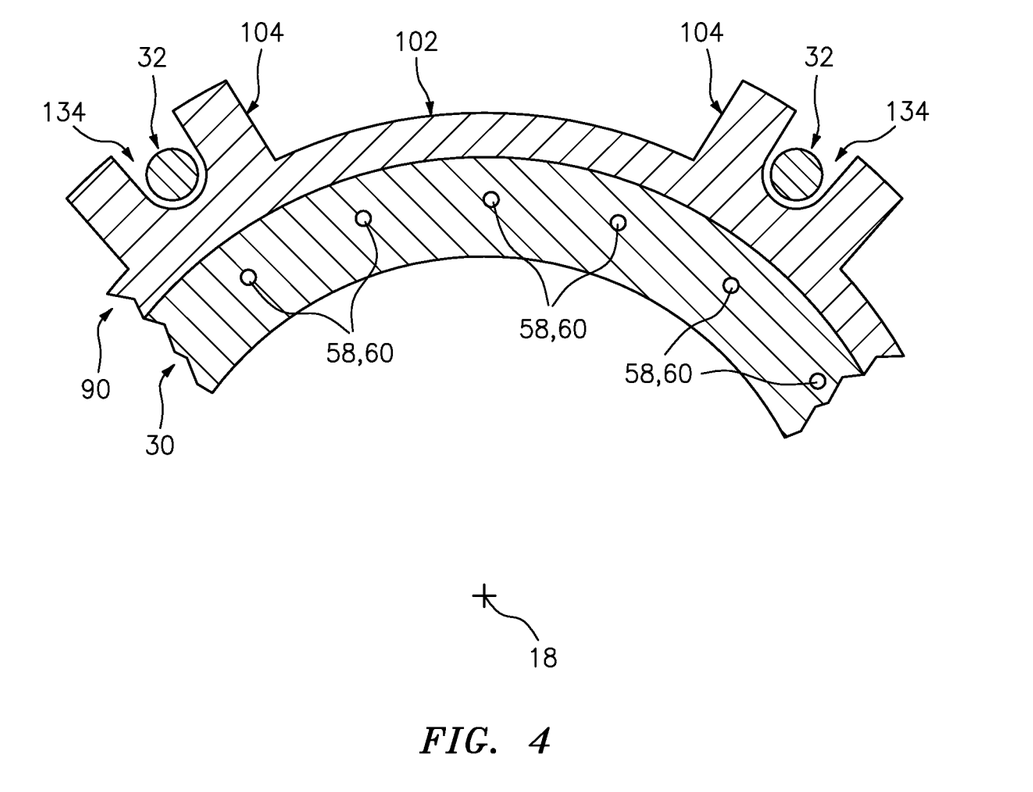
FIG. 4 is a cross-sectional illustration of a portion of the engine assembly of FIG. 1 along line 4-4.
Figure 5:
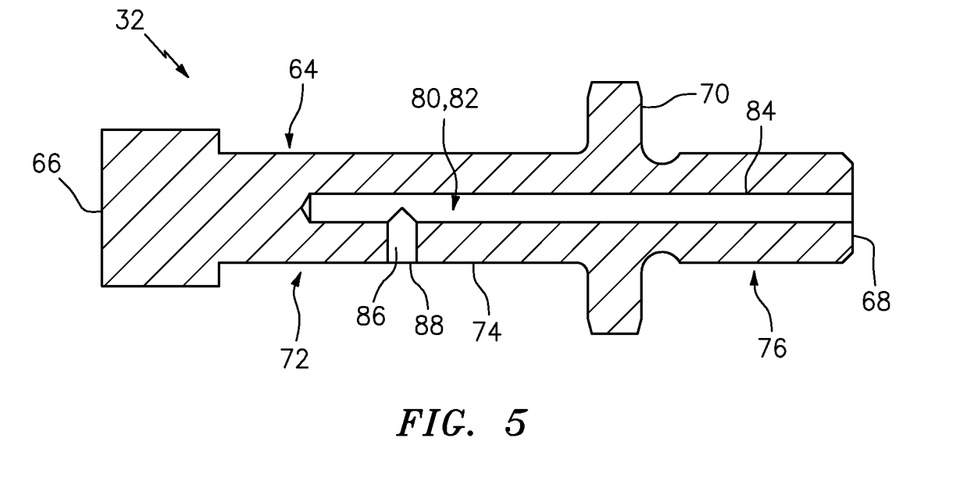
FIG. 5 is a side sectional illustration of a guide rail pin.

Referring to FIG. 4, the guide rails 32 are arranged circumferentially about the axial centerline 18 in an annular array. Referring to FIG. 5, each of the guide rails 32 may be configured as or otherwise include a guide pin. For example, each guide rail 32 of FIG. 5 may have, but is not limited to, a generally cylindrical body 64 that extends axially between an axial first end 66 and an axial second end 68. An annular flange 70 may projects out from and circumscribes body 64. An axial first portion 72 of the body 64, axially between the axial first end 66 and the flange 70, may be configured with a smooth cylindrical surface 74. An axial second portion 76 of the body 64, axially between the axial second end 68 and the flange 70, may be configured with threads; e.g., the portion 76 is a threaded portion.

At least one of the guide rails 32 is configured with an internal guide rail fluid passage 80; e.g., a pin fluid passage. This fluid passage 80 includes/is formed by a (e.g., single) passageway 82 through the guide rail 32. The passageway 82 includes/is formed by a bore 84 and an aperture 86 (e.g., a hole). The bore 84 extends axially partially into the guide rail 32 from the axial second end 68. The aperture 86 projects out from and is thereby fluidly coupled with the bore 84. The aperture 86 extends radially through a sidewall of the guide rail 32 to an outlet 88 in the cylindrical surface 74. Note, in some embodiments, the guide rail 32 may be configured with more than one aperture 86.

Referring to FIG. 1, the seal support assembly 34 is configured to translate axially along the guide rails 32. The seal support assembly 34 is also configured to support and provide fluid to the seal element 30. The seal support assembly 34 of FIG. 1 includes a seal carrier 90 and at least one fluid coupling device 92.

Figure 6:
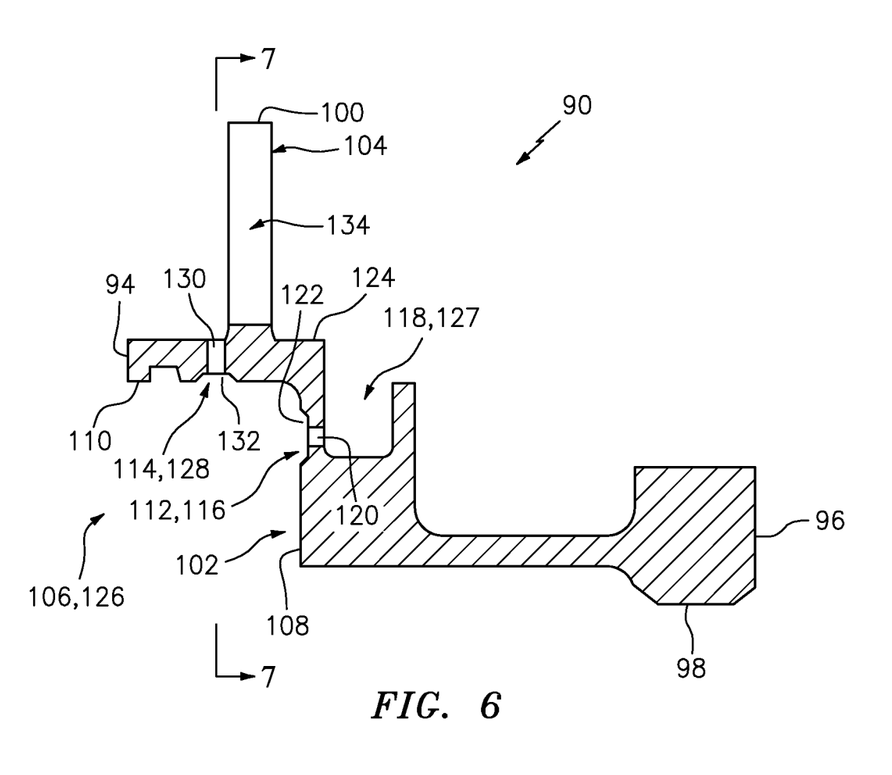
FIG. 6 is a partial side sectional illustration of a seal carrier.
Figure 7:
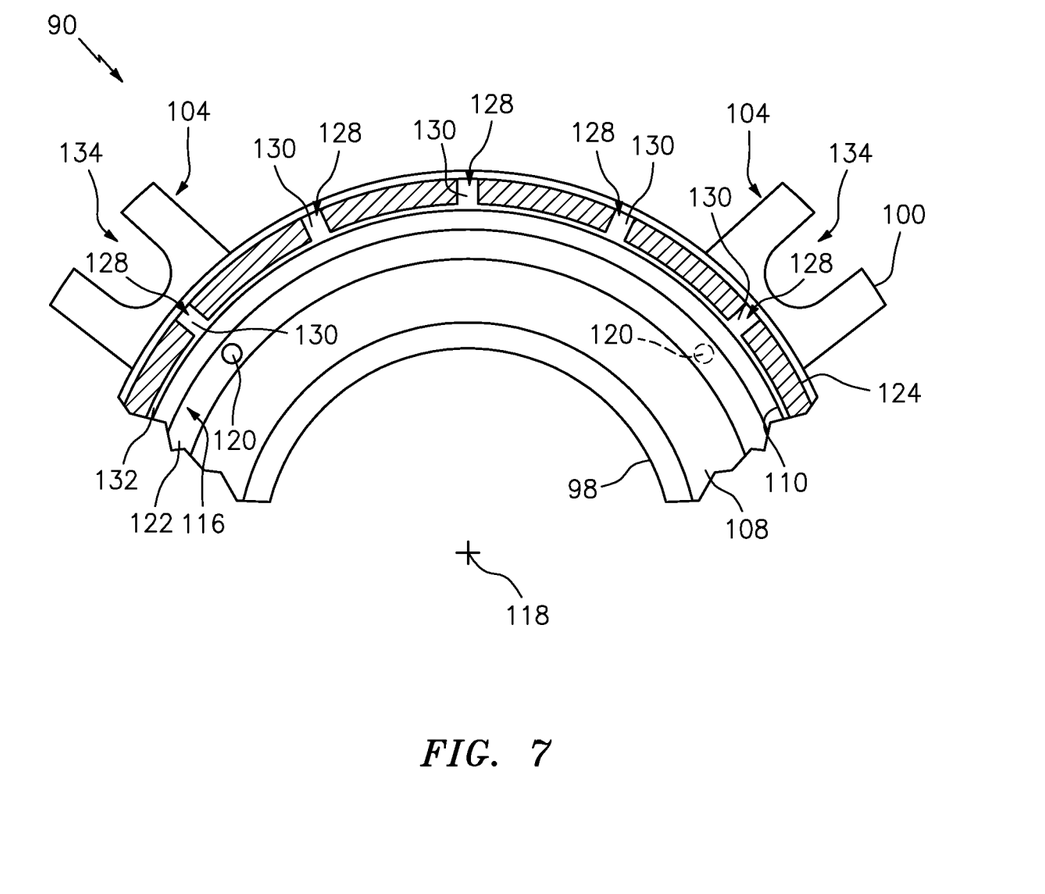
FIG. 7 is a cross-sectional illustration of a portion of the seal carrier of FIG. 6 along line 7-7.

Referring to FIG. 6, the seal carrier 90 is configured with a full hoop body that extends circumferentially about the axial centerline 18; see also FIG. 7. The seal carrier 90 extends axially along the axial centerline 18 between an axial first end 94 and an axial second end 96. The seal carrier 90 extends radially, relative to the axial centerline 18, between a radial inner side 98 and a radial outer side 100.

The seal carrier 90 of FIG. 6 includes a tubular base 102 and one or more flanges 104. The base 102 is configured with an annular recess/notch 106. This recess 106 extends axially partially into the base 102 from the axial first end 94 to an axial end surface 108. The recess 106 extends radially partially into the base 102 from the radial inner side 98 to a radial end surface 110. The recess 106 forms a receptacle 126 for the seal element 30 as described below in further detail.

The base 102 is configured with one or more seal carrier fluid passages 112 and 114. The first carrier fluid passage 112 includes/is formed by at least one passageway 116 through the base 102. This passageway 116 includes/is formed by at least one first aperture 118 (e.g., a hole), at least one second aperture 120 (e.g., a hole) and a slot 122. The first aperture 118 extends radially partially into the base 102 from an outer surface 124 of the base 102. This first aperture 118 is configured to form a receptacle 127 for the fluid coupling device 92 as described below in further detail. The second aperture 120 extends axially within the base 102 between the first aperture 118 and the slot 122. The second aperture 120 thereby fluidly couples the first aperture 118 to the slot 122. The slot 122 is located in the axial end surface 108. This slot 122 may be an annular slot (e.g., see FIG. 7), which extends circumferentially around the centerline 18.

The second carrier fluid passage 114 includes/is formed by one or more passageways 128 through the base 102. These passageways 128 may be located circumferentially about the axial centerline 18 in an annular array as shown in FIG. 7. Referring again to FIG. 6, each passageway 128 includes/is formed by an aperture 130 (e.g., a hole) and a slot 132. The slot 132 may be shared by all of the passageways 128; e.g., each passageway 128 includes a circumferential portion of the slot 132. The slot 132 is located in the radial end surface 110. This slot 132 may be an annular slot, which extends circumferentially around the centerline 18. The aperture 130 extends radially into the base 102 to the slot 132 from the outer surface 124 and thereby is fluidly coupled with the slot 132.

Referring to FIG. 7, the flanges 104 are arranged circumferentially about the base 102. Each flange 104 includes a slot 134.

Figure 8:
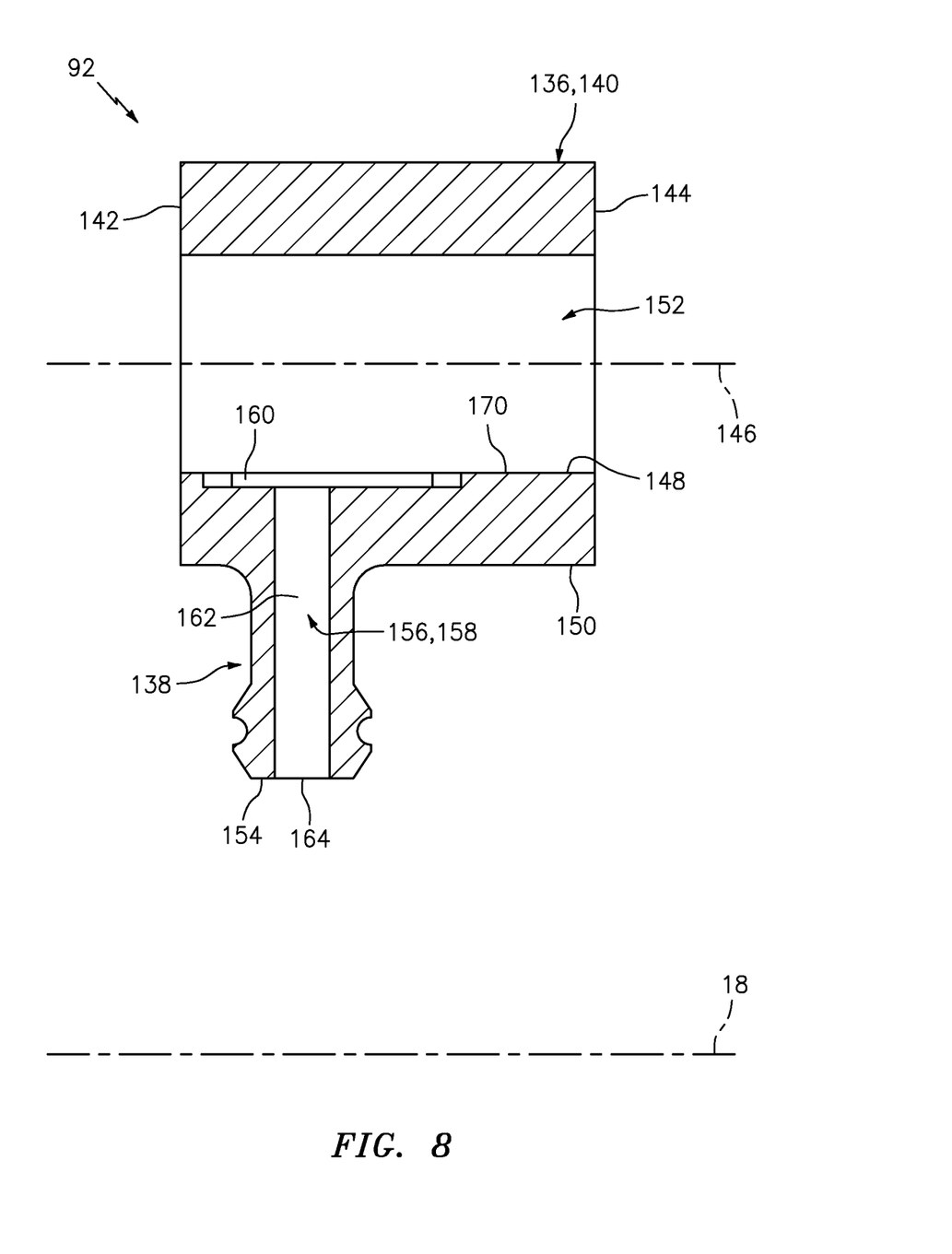
FIG. 8 is a side sectional illustration of a fluid coupling device.

Referring to FIG. 8, the fluid coupling device 92 includes a sleeve 136 (e.g., a linear hydrostatic bearing) and a tube 138 (e.g., a jumper tube). The sleeve 136 is configured as a tubular sleeve body 140. The sleeve body 140 extends axially between an axial first end 142 and an axial second end 144. The sleeve body 140 extends radially, relative to an axis 146 of the sleeve 136, between a radial inner side 148 and a radial outer side 150, where the axis 146 may be parallel to the centerline 18. The radial inner side 148 of the sleeve 136 forms a bore 152 that extends axially through the fluid coupling device 92 and its sleeve 136.

The tube 138 may be configured as a tubular projection. The tube 138 projects radially, relative to the axis 146 of the sleeve 136, out from the radial outer side 150 of the sleeve 136 to a distal end 154.

The fluid coupling device 92 is configured with at least one coupling device fluid passage 156. This fluid passage 156 includes/is formed by a (e.g., single) passageway 158 through the fluid coupling device 92. This passageway 158 includes/is formed by a slot 160 and an aperture 162 (e.g., a hole). The slot 160 is located in the sleeve 136 at its radial inner side 148. The slot 160 extends partially axially within the sleeve 136 and may extend either fully circumferentially or partially circumferentially about the axis 146 of the sleeve 136. The aperture 162 projects out from the slot 160 and extends through the sleeve 136 and the tube 138 to an outlet 164 at the distal end 154. In this embodiment, an outer portion of the aperture 162 forms a bore of the tube 138.

Referring to FIG. 1, the seal land 28 is arranged with the rotating element 12 in such a manner so as to be rotatable with the rotating element 12 about the axial centerline 18. The seal land 28 of FIG. 1, for example, circumscribes and is fixedly mounted to the rotating element 12.

The guide rails 32 are fixedly mounted to the static structure 20. For example, the threaded portion 76 of each guide rail 32 may be screwed into a corresponding tapped hole in the static structure 20.

The seal element 30 is seated in the receptacle 126 of the seal carrier 90. A split ring 166 and/or another device secures the seal element 30 within the receptacle 126 such that the seal element 30 is fixedly mounted to the seal carrier 90. Of course, the seal element 30 may also or alternatively be mounted to the seal carrier 90 using other fastening and/or bonding techniques. The seal element fluid passage 56 is fluidly coupled with and between the first and the second seal carrier fluid passages 112 and 114. More particularly, a fluid interface is formed between the passage 112 slot and the passage 56 apertures and a fluid interface is formed between the passage 56 apertures and the passage 114 slot.

The tube 138 is seated in the receptacle 127 of the seal carrier 90. More particularly, the tube 138 projects radially, relative to the axial centerline 18, into the receptacle 127 to its distal end 154 (see FIG. 8). The elements 90 and 138 may be configured such that there is a relatively tight fit between those elements 90 and 138 in order to form a seal interface therebetween. An annular ring seal 168 may also or alternatively be arranged between the tube 138 and the seal carrier 90.

The fluid coupling device 92 is mated with/slidably mounted on a respective one of the guide rails 32—the guide rail 32 with the internal rail fluid passage 80. In particular, the guide rail 32 is inserted through the bore of the sleeve 136 such that a cylindrical surface 170 at the radial inner side of the sleeve 136 engages the cylindrical surface 74 of the guide rail 32. The surfaces 74 and 170 may be configured (e.g., sized) such that there is a relatively tight fit between the elements 32 and 136 in order to form a seal interface therebetween. The coupling fluid passage 156 is fluidly coupled with the guide rail fluid passage 80. More particularly, a fluid interface is formed between the passage 80 aperture and the passage 156 slot.

The seal carrier 90 is mated with the guide rails 32. In particular, each of the guide rails 32 projects through a respective flange slot 134; see also FIG. 4.

One or more spring elements 172 may be arranged between the static structure 20 and the seal carrier 90. These spring elements 172 are configured to bias the seal carrier 90 and, thus, the seal element 30 away from the static structure 20 and towards the seal land 28. In particular, the spring elements 172 cause the surfaces 44 and 54 to axially sealingly engage (e.g., contact) one another.

During operation of the assembly 10 of FIG. 1, fluid (e.g., lubricant and/or coolant) flows through the fluid passages 174, 80, 156, 112, 56 and 114. In particular, the fluid flows sequentially through the fluid passages174, 80, 156, 112, 56 and 114 and is discharged into a bearing compartment 176 for collection in a bearing compartment sump. Heat energy may be transferred from the seal element 30 into the fluid as the fluid travels through the seal element fluid passage 56. The flow of the fluid through the seal element 30 may thereby cool the seal element 30 during operation and, thus, mitigate heat related stresses and degradation of the seal element 30 cause by rubbing friction between the elements 28 and 30.

In order to accommodate engine vibrations and differential thermal expansion between the components 90 and 92, the seal carrier 90 and the fluid coupling device 92 are each adapted to move (e.g., translate) axially along the guide rail(s) 32. In addition, the fluid coupling device 92 may also move (e.g., radially) relative to the seal carrier 90 to accommodate radial movements/shifting of the seal carrier 90 relative to the guide rails 32.

The assembly 10 is described above as including a single fluid coupling device 92 for ease of description. However, in other embodiments, the assembly 10 may include one or more additional fluid coupling devices 92 such that a plurality or all of the guide rails 32 is associated with a respective fluid coupling device 92. The number of fluid coupling devices 92 included may be selected based on the cooling requirements of the seal element 30. In such embodiments, the fluid passage 112 includes a plurality of the apertures 120; e.g., see dashed aperture 120 in FIG. 7.

In some embodiments, the assembly 10 may also include one or more secondary seals. For example, the assembly of FIG. 1 includes an annular secondary seal element 177 axially between the seal element 54 and the seal carrier 90. This secondary seal element 177 is configured to separate cooling fluids from boundary fluids.

Figure 9:
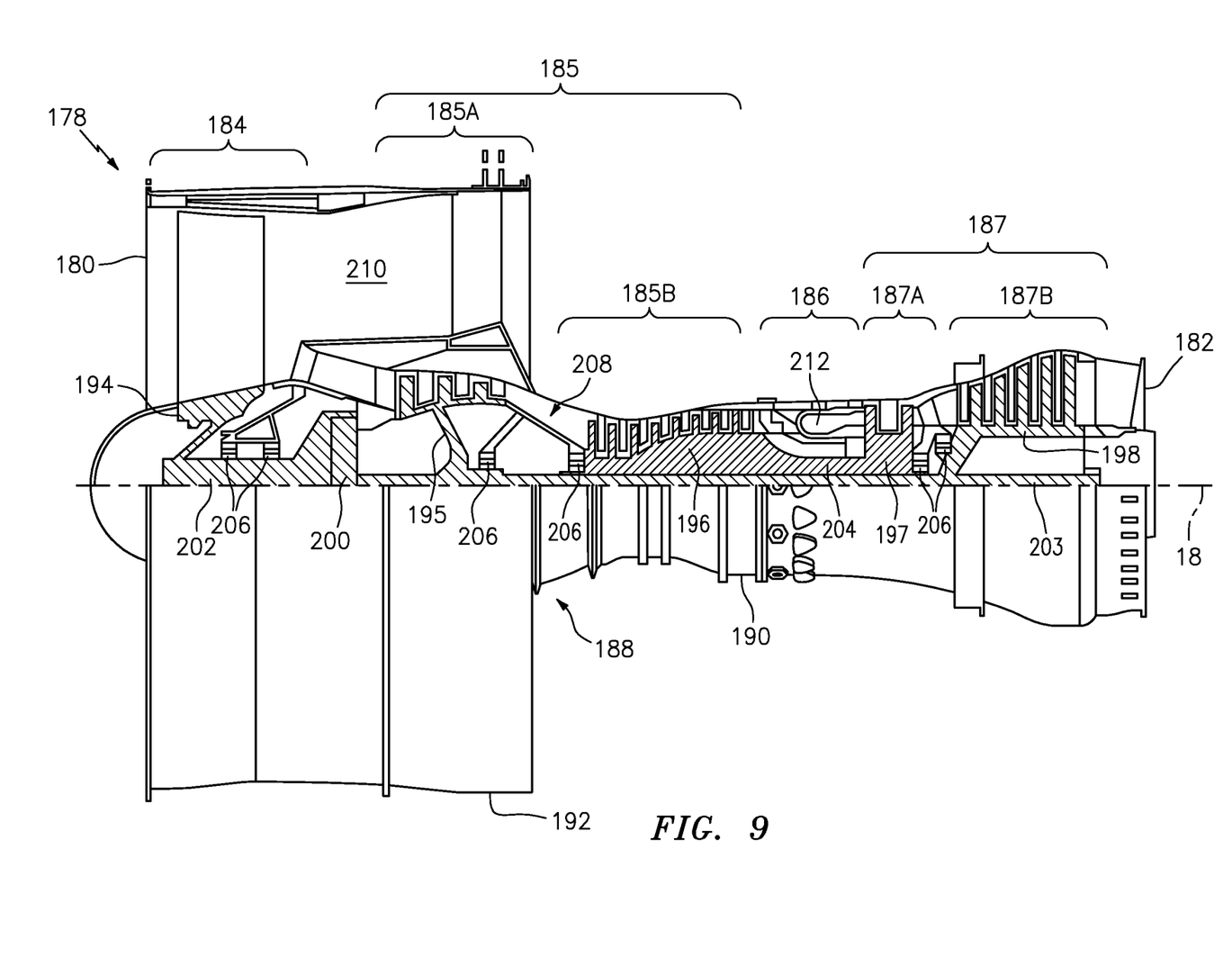
FIG. 9 is a side cutaway illustration of a geared turbine engine with which the engine assembly of FIG. 1 may be configured.

FIG. 9 is a side cutaway illustration of a geared turbine engine 178 with which the assembly 10 may be configured. The turbine engine 178 extends along an axial centerline (e.g., the centerline 18) between an upstream airflow inlet 180 and a downstream airflow exhaust 182. The turbine engine 178 includes a fan section 184, a compressor section 185, a combustor section 186 and a turbine section 187. The compressor section 185 includes a low pressure compressor (LPC) section 185A and a high pressure compressor (HPC) section 185B. The turbine section 187 includes a high pressure turbine (HPT) section 187A and a low pressure turbine (LPT) section 187B.

The engine sections 184-187 are arranged sequentially along the centerline 18 within an engine housing 188. This housing 188 includes an inner case 190 (e.g., a core case) and an outer case 192 (e.g., a fan case). The inner case 190 may house one or more of the engine sections 185-187; e.g., an engine core. The outer case 192 may house at least the fan section 184.

Each of the engine sections 184, 185A, 185B, 187A and 187B includes a respective rotor 194-198. Each of these rotors 194-198 includes a plurality of rotor blades arranged circumferentially around and connected to one or more respective rotor disks. The rotor blades, for example, may be formed integral with or mechanically fastened, welded, brazed, adhered and/or otherwise attached to the respective rotor disk(s).

The fan rotor 194 is connected to a gear train 200, for example, through a fan shaft 202. The gear train 200 and the LPC rotor 195 are connected to and driven by the LPT rotor 198 through a low speed shaft 203. The HPC rotor 196 is connected to and driven by the HPT rotor 197 through a high speed shaft 204. The shafts 202-204 are rotatably supported by a plurality of bearings 206; e.g., rolling element and/or thrust bearings. Each of these bearings 206 is connected to the engine housing 188 by at least one stationary structure such as, for example, an annular support strut. The rotating element 12 of FIG. 1 may be configured as any one of the shafts 202-204 and the bearing 14 of FIG. 1 may be configured as any one of the bearings 206.

During operation, air enters the turbine engine 178 through the airflow inlet 180. This air is directed through the fan section 184 and into a core gas path 208 and a bypass gas path 210. The core gas path 208 extends sequentially through the engine sections 185A-187B. The air within the core gas path 208 may be referred to as "core air". The bypass gas path 210 extends through a bypass duct, which bypasses the engine core. The air within the bypass gas path 210 may be referred to as "bypass air".

The core air is compressed by the compressor rotors 195 and 196 and directed into a combustion chamber 212 of a combustor in the combustor section 186. Fuel is injected into the combustion chamber 212 and mixed with the compressed core air to provide a fuel-air mixture. This fuel air mixture is ignited and combustion products thereof flow through and sequentially cause the turbine rotors 197 and 198 to rotate. The rotation of the turbine rotors 197 and 198 respectively drive rotation of the compressor rotors 196 and 195 and, thus, compression of the air received from a core airflow inlet. The rotation of the turbine rotor 198 also drives rotation of the fan rotor 194, which propels bypass air through and out of the bypass gas path 210. The propulsion of the bypass air may account for a majority of thrust generated by the turbine engine 178, e.g., more than seventy-five percent (75%) of engine thrust. The turbine engine 178 of the present disclosure, however, is not limited to the foregoing exemplary thrust ratio.

The assembly 10 may be included in various turbine engines other than the one described above. The assembly 10, for example, may be included in a geared turbine engine where a gear train connects one or more shafts to one or more rotors in a fan section, a compressor section and/or any other engine section. Alternatively, the assembly 10 may be included in a turbine engine configured without a gear train. The assembly 10 may be included in a geared or non-geared turbine engine configured with a single spool, with two spools (e.g., see FIG. 9), or with more than two spools. The turbine engine may be configured as a turbofan engine, a turbojet engine, a propfan engine, a pusher fan engine or any other type of turbine engine. The present disclosure therefore is not limited to any particular types or configurations of turbine engines.

While various embodiments of the present disclosure have been described, it will be apparent to those of ordinary skill in the art that many more embodiments and implementations are possible within the scope of the disclosure. For example, the present disclosure as described herein includes several aspects and embodiments that include particular features. Although these features may be described individually, it is within the scope of the present disclosure that some or all of these features may be combined with any one of the aspects and remain within the scope of the disclosure. Accordingly, the present disclosure is not to be restricted except in light of the attached claims and their equivalents.

What is claimed is:

1. An assembly for a gas turbine engine, comprising:
a pin configured with a pin fluid passage;
a seal support assembly mated with and slidable along the pin; and
a seal element mounted to the seal support assembly, the seal element configured with a seal element fluid passage that is fluidly coupled with the pin fluid passage through the seal support assembly;
wherein the seal element extends circumferentially around a centerline;
wherein an inlet portion of the seal element fluid passage extends axially along the centerline into the seal element; and
wherein an outlet portion of the seal element fluid passage extends radially, relative to the centerline, into the seal element.

2. The assembly of claim 1, further comprising a seal land sealingly engaged with the seal element.

3. The assembly of claim 2, further comprising a spring element engaged with the seal support assembly and configured to bias the seal element against the seal land.

4. The assembly of claim 1, wherein the seal element is an annular carbon seal element.

5. The assembly of claim 1, wherein
the seal support assembly comprises a seal carrier and a fluid coupling device;
the seal carrier is mated with and slidable along the pin, and the seal carrier is configured with a carrier fluid passage that is fluidly coupled with the seal element fluid passage; and
the fluid coupling device is mounted to and slidable along the pin, and the fluid coupling device is configured with a device fluid passage that fluidly couples the pin fluid passage with the carrier fluid passage.

6. The assembly of claim 5, wherein the fluid coupling device is configured to move relative to the seal carrier.

7. The assembly of claim 5, wherein
the fluid coupling device includes a sleeve and a tube;
the sleeve is mounted to and slidable along the pin; and
the tube projects out from the sleeve and into a receptacle of the seal carrier.

8. The assembly of claim 7, wherein
the device fluid passage includes a device slot and a device aperture;
the device slot is formed in the sleeve and abuts the pin; and
the device aperture projects out from the device slot and extends through the sleeve and the tube.

9. The assembly of claim 8, wherein
the pin fluid passage includes a pin bore and a pin aperture that projects out from the pin bore and extends through a sidewall of the pin; and
an outlet of the pin aperture interfaces with the device slot.

10. The assembly of claim 7, further comprising a ring seal arranged between the tube and the seal carrier.

11. The assembly of claim 5, wherein the carrier fluid passage includes an annular slot that interfaces with an inlet of the seal element fluid passage.

12. The assembly of claim 5, wherein
the seal carrier includes a flange; and
the pin projects through a channel that extends radially into the flange.

13. The assembly of claim 1, further comprising a static structure of the gas turbine engine, the pin mounted to the static structure.

14. An assembly for a gas turbine engine, comprising: a plurality of pins arranged in an array about a centerline of the gas turbine engine, at least one of the plurality of pins configured with a pin fluid passage; a seal support assembly mated with and slidable along each of the plurality of pins; and a sea element extending circumferentially around the centerline, the seal element mounted to the seal support assembly, and the seal element configured with a seal element fluid passage that is fluidly coupled with the pin fluid passage through the seal support assembly.

15. An assembly for a gas turbine engine, comprising:
a guide rail configured with a rail fluid passage;
a seal carrier mated with and axially slidable along the guide rail, the seal carrier configured with a carrier fluid passage;
a seal element mounted to the seal carrier, the seal element configured with a seal element fluid passage adapted to receive fluid from the carrier fluid passage; and
a fluid coupling device mounted to and axially slidable along the guide rail, the fluid coupling device configured with a device fluid passage adapted to direct the fluid from the rail fluid passage to the carrier fluid passage.

16. An assembly for a gas turbine engine, comprising:
a guide rail configured with a rail fluid passage;
a translating device mated with and axially translatable along the guide rail, the translating device configured with a translating device fluid passage; and
a fluid coupling device mounted to and axially slidable along the guide rail, the fluid coupling device configured with a coupling device fluid passage adapted to direct fluid from the rail fluid passage to the translating device fluid passage;
wherein the fluid coupling device is adapted to move radially relative to the translating device.

17. The assembly of claim 16, wherein the guide rail is a guide pin.

18. The assembly of claim 16, further comprising a seal element mounted to the translating device, the translating device configured as a seal carrier.

19. The assembly of claim 18, wherein the seal element is configured with a seal element fluid passage adapted to receive the fluid from the translating device fluid passage.

* * * * *